Figure 1:
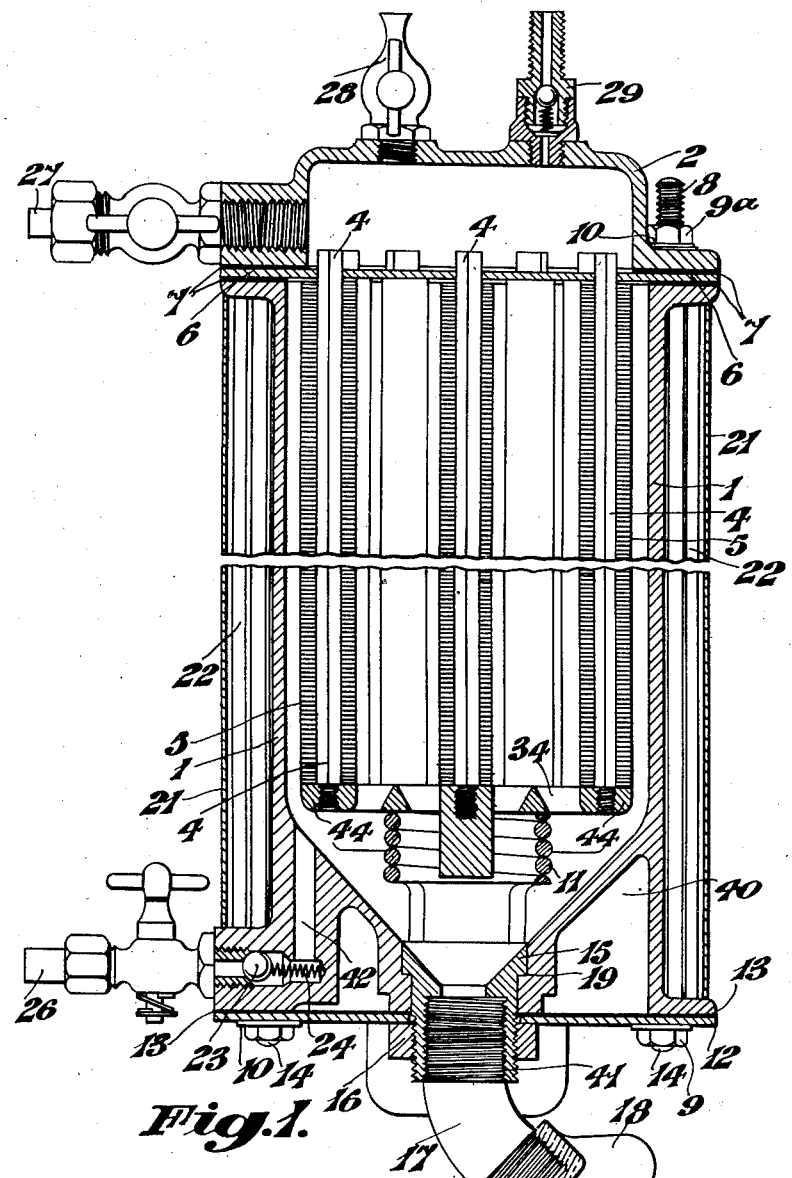

July 12, 1932.   C. S. GARLAND ET AL   1,866,970
APPARATUS FOR PURIFYING USED LUBRICATING OIL AND THE LIKE
Filed Feb. 24, 1927   4 Sheets-Sheet 1

Patented July 12, 1932

1,866,970

UNITED STATES PATENT OFFICE

CHARLES SAMUEL GARLAND, THOMAS EDWARD BEACHAM, AND JOSEPH ALLEN PICKARD, OF LONDON, ENGLAND

APPARATUS FOR PURIFYING USED LUBRICATING OIL AND THE LIKE

Application filed February 24, 1927, Serial No. 170,701, and in Great Britain March 1, 1926.

This invention relates to oil reclaiming apparatus and has for its object to provide efficient means for filtering or purifying the lubricating oil used in internal combustion and other engines. Such oil after use frequently contains very fine particles of solid matter produced by the decomposition of the oil and in some cases of the fuel used in the explosive charge in the engine cylinder as well as dust, dirt, grit and the like, and by providing efficient means for removing such solid matter the lubricating value of the oil is restored and the oil can be used again in the engine without detriment to the life of the bearings and moving parts of the engine.

Attempts have been made to produce apparatus capable of performing these functions by employing filtering media such as porous earthenware, interleaving metal laminæ, or filter cloths impregnated with some form of filter aid. It has been found that with the exception of those employing the edge filtration principle, all filters hitherto applied have been ineffective in removing the finer suspended particles, insomuch that it has been impossible hitherto to obtain from oil which has become dirty through the running of an internal combustion engine, oil which is transparent and in condition substantially equivalent to that before taking it into use. In some cases where a partial filtration and improvement has been accomplished the filter surface has rapidly become coated with the fine particles removed, which has resulted in the choking of the filter and speedy reduction of the rate of passage of oil through it to an insignificantly small figure.

The present invention consists in using the heat of the engine which would otherwise be wasted, to heat the oil undergoing filtration, thereby reducing its viscosity and enabling it to flow more rapidly through the filter and the deposited cake of separated matter, if any, upon the filter surface.

The means for utilizing waste heat from an internal combustion engine for the purpose of aiding the filtration and purification of the lubricating oil used in the engine may consist in supporting the filter adjacent the engine or connecting it thereto by heat conducting connections, so that it will receive heat therefrom by radiation or conduction.

In order to prevent untreated oil from being returned from the filter to the engine such as by pressure generated by the gasification of any constituent of the oil, means such as a non-return valve is provided in a pipe used for conveying oil from a sump or the like into which it has drained from the bearing surfaces of the engine.

Means may also be provided for regulating and tempering the supply of heat to the filter so that over heating and deterioration of the oil while undergoing filtration is avoided, and means may also be provided for improving the heat resisting qualities of the filtering medium used in the filter.

The filtering medium may be of the kind consisting of superimposed laminæ of paper, and it has been found that in certain conditions of temperature, pressure, and chemical action, the material of such laminæ has been injured and even caused to fail to function. In some cases resort has been had to laminæ of asbestos paper, but it has been found that asbestos paper of the ordinary commercial varieties is not suitable, as the binding material commonly employed—such as, paper, starch and glue—partake of the disabilities of paper itself and obscure or destroy the satisfactory filtering properties of the asbestos proper. In accordance with the present invention the filtering packs or piles may be prepared from commercial asbestos paper, by eliminating the organic objectionable binding materials by roasting or incinerating the filter bodies. This process leaves only the asbestos itself, pure, in the best filtering state and free from the detrimental presence of organic matter. The filter bodies thus prepared are amply strong for all ordinary use although the individual rings or strips from which they are composed would have been excessively difficult or impossible to handle and manipulate without following the above method of operation. In cases where extra strength is required the filter edges or the whole filter body, may be strengthened by the treatment described in the specification of British Patent No. 249,202, of December 17, 1924.

Several different methods may be adopted to employ part of the waste heat of the engine for the useful purpose of warming the oil undergoing filtration. In particular the following ways may be mentioned.

(1) A portion of the exhaust gases may be diverted from the exhaust pipe and caused to flow through a single or double jacket surrounding the filter body or part of it.

(2) The filter may be placed in close juxtaposition to the exhaust pipe or other heated part of the engine so as to take up heat by radiation and from the hot air close to it.

(3) The filter may be rigidly attached by a clamp or arm or other suitable connection of suitable dimensions to the exhaust pipe or other heated part so that it acquires heat by conduction as well as by radiation.

(4) The water in the cooling system of the engine may be caused to pass through a single or double jacket attached to the filter.

The filter body may be wholly or partly immersed in a liquid circulated through a cooling device, for instance the liquid may be circulated by thermo-siphonic action and cooled at or near its highest point in the circulating system. The action of the cooling liquids may be improved by including in it suitable solids such as fusible metals or alloys or high melting point waxes, which may be of the same nature as the liquid and melt at a predetermined temperature and by their latent heat tend to keep the temperature constant. A constant temperature in the liquid surrounding the filter may be maintained by causing the liquid to boil the vapours being condensed and returned to the liquid.

In order to prevent loss of heat from the oil undergoing filtration, the filter may be surrounded by lagging material at all parts except those in contact with the supply of heat.

Figure 2:
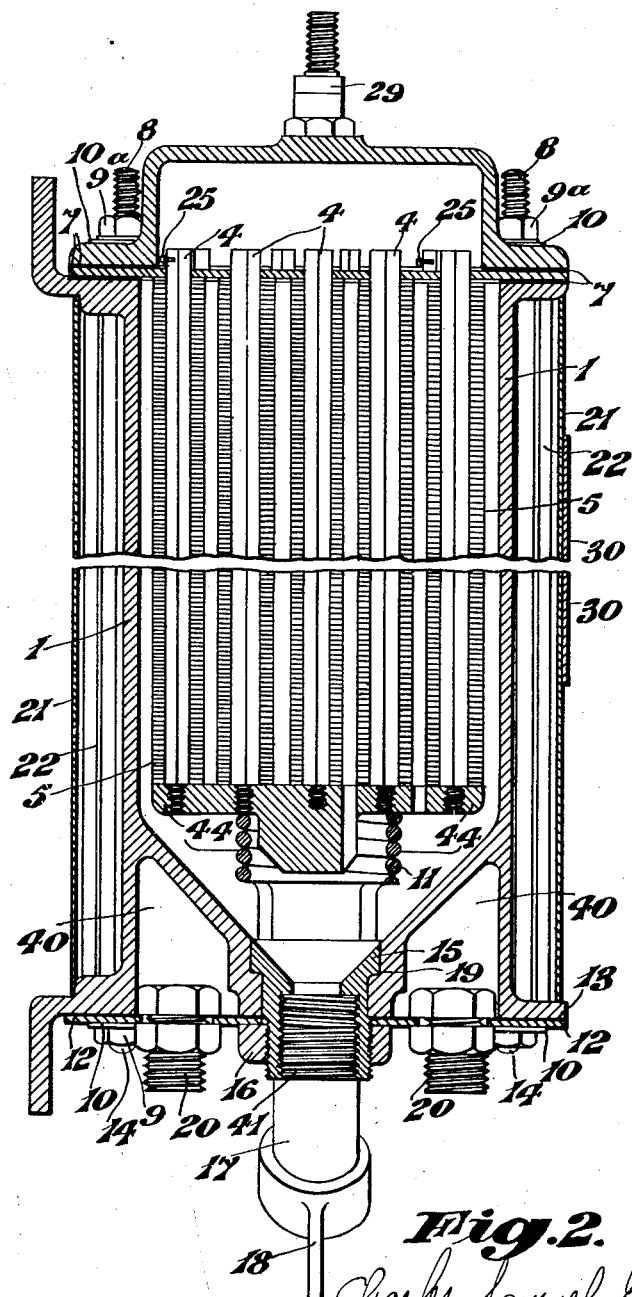
Figures 4, 5:
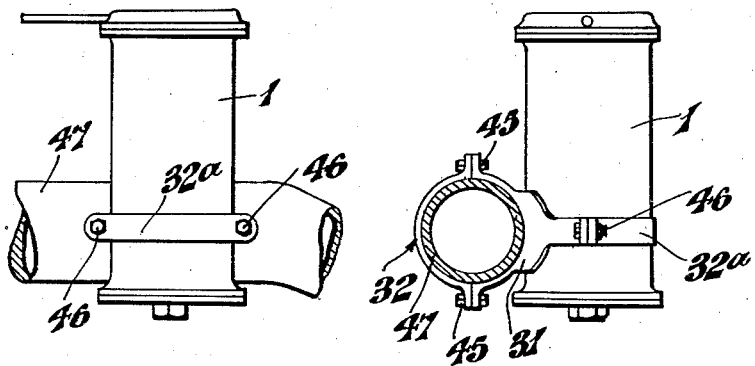
Figures 3, 6:
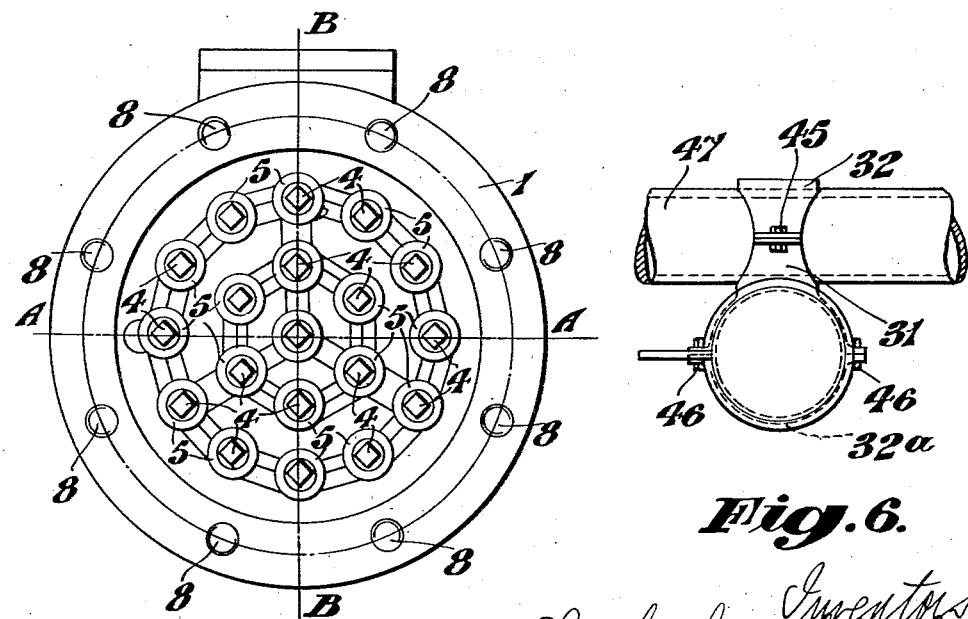
Figures 7, 8:
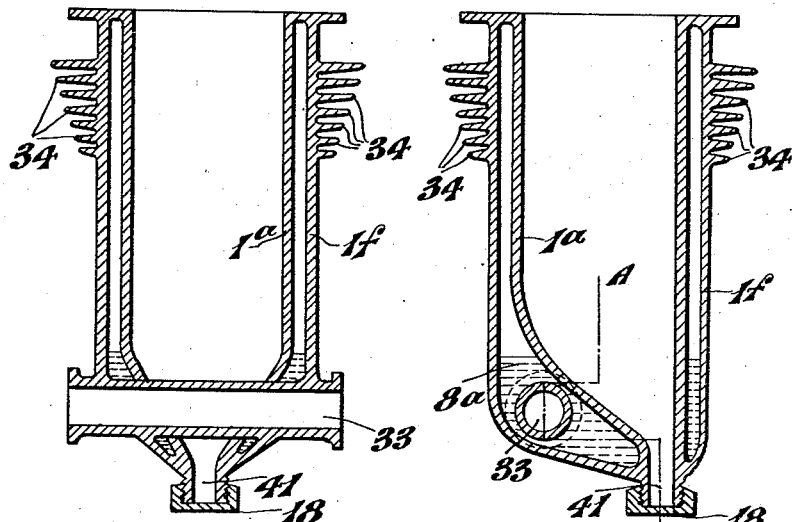
Figure 9:
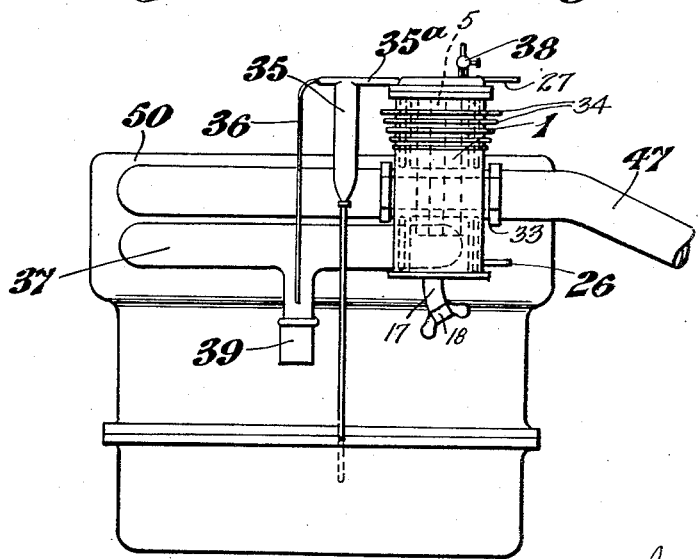

Various methods of carrying out the invention are illustrated by the accompanying drawings, wherein Figure 1 is a vertical section elevation on the line A—A of Figure 3 of one form of the apparatus, Figure 2 a transverse vertical section on the line B—B of Figure 3 and Figure 3 a plan thereof with the top plate and cover removed. Figure 4 is an elevation, Figure 5 a side view taken at right angles to Fig. 4 and Figure 6 a plan illustrating one method of attaching the apparatus to the exhaust pipe of an internal combustion engine; Figures 7 and 8 are respectively side and front elevations of a modified construction of the filter body or casing while Figure 9 is a diagrammatic elevation of the oil reclaiming apparatus as applied to an internal combustion engine.

The used oil purifier as shown in Figures 1, 2 and 3 consists of a body 1 with a funnel-shaped bottom surrounded by a hollow space 40 and provided with a sludge outlet 41. The outlet 41 is fitted with a sludge pipe 17 carrying a cap 18. The attachment of the sludge pipe 17 is by means of a bushing 15 and a washer 19. The hollow space 40 surrounding the funnel shaped bottom is converted into a partial double jacket by means of a bottom plate 12, which is made gas tight by means of a jointing washer 13 and is secured to the body 1 of the filter by studs 14 and nuts 9.

Oil enters the purifying apparatus by a dirty-used lubricating oil inlet valve 26 and the passage 42. Overheated oil, as referred to above, is prevented from being returned to the engine along the supply pipe through generation of pressure in the body of the apparatus, by means of a non-return valve consisting of a spring 24 and non-return ball 23. The body of the apparatus is closed at its upper-end by a top plate 6 and washers 7 and together with a cover 2 is held down tight on the body 1 by top studs 8 and nuts 9a.

The filtering bodies are of the laminæ column type and are mounted on guide rods 4 screwed into a grid 3. The grid carries small platforms 44 which support the packs 5 of thin sheet material and close the lower end of the central passage through them. The packs are pressed by means of the spring 11 tightly against the under side of the top plate 6, that is between it and the grid 3 thus preventing passage of oil from one side of the top plate to the other except by way of the filtering packs 5. The top plate 6 is provided with circular holes 4a through which the square guide rods 4 protrude at their upper end and the filtered oil makes its way, after passing between the laminæ of the filtering bodies, along the passage left by the square rods 4 in the round holes in the packs 5 to the delivery side of the top plate 6. The clean lubricating oil then flows away by a clean oil outlet 27 having given up any undesired vapours or light fractions such as gasoline eliminated by the heat through an outlet or breather 28. The cover 2 also carries a compressed air connection 29 for admitting air in the cleaning operation. The body of the purifier is prevented from losing heat by a lagging of asbestos 22. To heat the filter connection is made to the engine exhaust pipe by one of two connections 20, the exhaust gases escaping by the other to a suitably arranged pipe.

Used lubricating oil from the sump of an engine to which the device is attached is pumped into the body of the purifier through the inlet 26, and is filtered by being forced between the laminæ of the packs 5 under pressure and is subsequently returned to the lubricating system by the outlet 27. The separated solids collect on the outer cylindrical surfaces of the packs and when enough has collected to slow the operation of the filter the filter is simply cleaned by the following operations. The breather 28, and cocks of the inlet and outlet 26 and 27 are all closed. The sludge outlet cap 18 is removed and the oil in the body of the filter allowed to flow away through the pipe 17 and returned to the sump. Compressed air is now admitted through the valve-controlled connection 29 and passes through the packs in the direction opposite to that formerly taken by the oil, removing in its passage the accumulated solid matter from the filter surfaces and assisting it to slide down to the funnel shaped bottom and out through the pipe 17.

The foregoing description and Figures 1, 2 and 3 show the type of filter employed when heating by exhaust gases if a double jacket is employed. When method (2) is employed, and the filter is fixed in close juxtaposition to the exhaust pipe of an internal combustion engine the general details are similar but the hollow chamber round the funnel-shaped bottom is unnecessary and is done away with. The general arrangement of the filter in this case is self-evident without the need of an illustration.

Method (3) where the purifier is attached to an exhaust pipe 47 by a clamp is illustrated in Figures 4, 5 and 6. An intermediate saddle piece 31 is placed between the filter 1 and the exhaust pipe, the exhaust pipe and the filter being held thereto by straps 32 and 32a fastened by nuts and bolts 45 and 46 as shown. The saddle piece 31 is of such dimensions, particularly cross-section, as may be necessary to conduct the right amount of heat from the exhaust pipe 47 to the filter 1. In this case also the bottom chamber round the funnel-shaped bottom is eliminated. Where method (4) is used, employing the cooling water system, a filter as shown in Figures 1 and 2 may be employed but instead of joining the connections 20 to a branch from the exhaust pipe the filter is incorporated by their help in the cooling water circulating system, and we find it most advantageous for the water to pass from the engine to the filter jacket on its way to the radiator.

Although the non-return valve 23, Figure 1 is effective in preventing the return of accidentally over-heated oil to the engine it is undesirable and unnecessary that the oil in practice should ever become over-heated. To avoid overheating we adopt one or other of several different methods. In one method we make use of a considerable quantity of liquid in which the filter body is wholly or partly immersed the liquid being circulated by thermo-siphon action and cooled at or near its highest point, and tending by its heat capacity to even up the irregularities in flow of heat to the filter. The action of such a liquid may be improved by including in its solids which may be of the same nature as the liquid and melt at a predetermined temperature and by their latent heat tend to keep the temperature constant. Examples of suitable solids are fusible metals or alloys and high melting point waxes. In a modification of this method we cause the liquid to boil and the vapours are condensed and returned again to the liquid, thus maintaining a constant temperature in the vessel surrounding the filter. A method of preventing overheating of the oil in the filter is illustrated by Figures 7 and 8. The body of the filter consists of a double walled vessel 1a and 1f and through the lower part of the jacket formed between the walls 1a and 1f a pipe 33 passes, carrying exhaust gases from the internal combustion engine. The space between the walls is filled to a desired level, sufficient to cover the pipe 33, with the liquid to be heated, and the outer wall may carry cooling fins and ribs 34 of the well known-type and which—in the case where the liquid is caused to boil— enable the outer walls 1f of the vessel to function as a reflux condenser. The most convenient temperature regulating liquid to make use of we find to be water, and to avoid boiling to dryness in exceptional circumstances the level may be kept substantially constant by connection of the jacket with the radiator.

In a modification the fins are dispensed with and the steam returned to the radiator by a pipe connection. In this filter body, as in the former, the bottom is funnel-shaped and carries a sludge outlet 41 closed by a sludge cap 18. In another method of regulating the temperature of the filter we transfer the heat of the exhaust gases to the filter by conduction from the exhaust pipe itself. The filter body may either be built integral with the exhaust pipe, or, more commonly, we bolt it tightly thereto in the way illustrated in Figures 4, 5 and 6 or otherwise, with such area of contact as to ensure sufficient conduction of the transference of the heat necessary. In this arrangement effective constancy of heating is provided for if the filter be placed fairly close to the exhaust valves, as the volume of exhaust gases tends to vary more than their temperature and the effect of increasing volume rather than increasing temperature is to heat the exhaust pipe over a greater length, but not greatly to vary its temperature at points on which the gases play at all loads.

In all these methods means are provided for automatically avoiding the transference to the filter body of any detrimental surplus of heat above that required to effect the efficient treatment in the filter of the liquid undergoing filtration.

Reference has been made in the earlier part of this specification to the elimination from oil undergoing filtration of water and light fractions as a result of the heating which it receives. In Figure 1 a breather, 28, is shown, permitting the escape of such light fractions as produce fairly high vapour pressure. We find, however, that the elimination of such light fractions is greatly assisted, and the filtered oil at the same time is cooled, if means are employed to draw a current of air over the filtered oil as it finds its way back to the sump. One method of arranging for this is shown in Figure 9 which shows diagrammatically a filter mounted upon an internal combustion engine 50. In this case the upper parts of an oil return pipe 35 are made sufficiently wide to prevent the possibility of becoming filled with filtered oil, and to admit of a current of air being drawn over the surface of the filtered oil without entraining oil. The current of air necessary is produced by attaching a pipe 36 at one end to a suitable position on the oil delivery pipe 35, while its other end makes connection with the inside of the induction pipe 37 of the engine. Air by this means is continuously drawn in through a cock 38 and passes over the hot oil lying in the head of the filter and horizontal part 35a of the delivery pipe, cooling it and at the same time evaporating off the water and any light fractions or contaminating oil which it may contain.

What we claim and desire to secure by Letters Patent is:—

1. Lubricating oil purifying apparatus for internal combustion engines comprising in combination a filter, means for delivering oil to be purified to said filter, means for delivering the purified oil from the filter, a vessel in which the filter is contained, a casing surrounding said vessel, means for heating the lower part of said vessel by waste heat derived from the engine, means for preventing the temperature rising above a given value and means for maintaining its upper portion sufficiently low to condense oil vapors generated by the heat of its lower portion.

2. Lubricating oil purifying apparatus for an internal combustion engine, comprising in combination a filter, means for circulating the oil to be purified through the filter, a vessel containing the filter, means for heating its lower portion by waste heat from the engine, and means for maintaining its upper portion at a temperature sufficiently low to condense oil vapors generated in the filter by the heat of its lower portion.

3. Lubricating oil purifying apparatus for an internal combustion engine, comprising a filter, means for circulating the oil to be purified through the filter, a vessel containing the filter, a heat interchanging jacket thereon, a heater and a condenser, the condenser being arranged at the upper portion of the jacket of the vessel while the heater is arranged below the condenser.

4. Lubricating oil purifying apparatus for an internal combustion engine, comprising a filter, means for circulating the oil to be purified through the filter, a vessel containing the filter, a heat interchanging jacket thereon, means for heating the jacket internally by the exhaust gases of the engine, the upper portion of the jacket being provided externally with radiating ribs of sufficient radiating capacity to condense vapors generated in the heated portion.

5. Lubricating oil purifying apparatus for an internal combustion engine, comprising a filter, means for circulating the oil to be purified through the filter, a vessel containing the filter having a jacket for heat interchanging fluid and a heating fluid circulating pipe, the jacket being provided at its upper portion only with heat radiating ribs, while the heating fluid circulating pipe extends through the lower portion of the jacket of the vessel and conveys heat to the vessel.

6. Lubricating oil purifying apparatus for an internal combustion engine, comprising an edge filtration filter, means for heating the lower portion of the same, a heat interchanging jacketed casing containing the filter, means for circulating the oil to be purified through the filter, and circumferential heat radiating ribs on the outer walls of the jacket, the said ribs being on the upper portion of the jacket only.

7. Lubricating oil purifying apparatus for an internal combustion engine, comprising in combination a filter, a vessel containing said filter, a jacket on the vessel, means for heating the lower portion of the jacket by waste heat from the engine, and means for cooling the upper portion of the jacket by the external air.

8. Lubricating oil purifying apparatus for an internal combustion engine, comprising in combination a filter, a vessel containing said filter, a jacket on the vessel, a heating fluid circulating pipe, and external cooling ribs, the heating fluid circulating pipe passing through the lower portion of the jacket while the cooling ribs are arranged on the outside of the upper portion only of the jacket.

9. Lubricating oil purifying apparatus for an internal combustion engine, comprising in combination a filter, means for circulating oil to be purified through the filter, a vessel containing the filter, a casing surrounding the said vessel and containing heat interchanging fluid, means for heating the lower portion of said vessel through the casing by waste heat from the engine, and means for preventing the overheating of the oil in the upper portion of the vessel.

In witness whereof we affix our signatures.

CHARLES SAMUEL GARLAND.
THOMAS EDWARD BEACHAM.
JOSEPH ALLEN PICKARD.